US010505665B2

(12) United States Patent
Di Taranto et al.

(10) Patent No.: US 10,505,665 B2
(45) Date of Patent: Dec. 10, 2019

(54) METHOD FOR MODULATION AND CODING SCHEME SELECTION AND RELATED NETWORK NODES AND TERMINAL DEVICES

(71) Applicant: Telefonaktiebolaget LM Ericsson (publ), Stockholm (SE)

(72) Inventors: Rocco Di Taranto, Lund (SE); Meng Wang, Sundbyberg (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 33 days.

(21) Appl. No.: 15/755,180

(22) PCT Filed: Mar. 14, 2016

(86) PCT No.: PCT/EP2016/055475
§ 371 (c)(1),
(2) Date: Feb. 26, 2018

(87) PCT Pub. No.: WO2017/032463
PCT Pub. Date: Mar. 2, 2017

(65) Prior Publication Data
US 2018/0248647 A1  Aug. 30, 2018

(30) Foreign Application Priority Data
Aug. 27, 2015  (WO) ................. PCT/EP2015/069699

(51) Int. Cl.
*H04L 1/00* (2006.01)
*H04L 5/00* (2006.01)
*H04W 72/08* (2009.01)

(52) U.S. Cl.
CPC .......... *H04L 1/0003* (2013.01); *H04L 1/0009* (2013.01); *H04L 1/0026* (2013.01); *H04L 5/006* (2013.01); *H04L 5/0007* (2013.01); *H04L 5/0055* (2013.01); *H04L 5/0085* (2013.01); *H04L 5/0094* (2013.01); *H04W 72/085*(2013.01); *H04L 5/0023* (2013.01); *H04L 5/0048* (2013.01)

(58) Field of Classification Search
CPC . H04W 72/1289; H04L 1/1621; H04B 7/0452
USPC .................................................. 370/329–339
See application file for complete search history.

(56) References Cited

U.S. PATENT DOCUMENTS

2005/0281221 A1  12/2005  Roh et al.
2009/0110087 A1*  4/2009  Liu ....................... H04L 1/0021
375/260
(Continued)

FOREIGN PATENT DOCUMENTS

EP  1898540 A1  3/2008
EP  1906569 A1  4/2008
(Continued)

OTHER PUBLICATIONS

A. Shojaeifard et al., Resource Allocation and Interference Management for Adaptive Modulation and Coding-Based OFDMA Cognitive Radio Networks, IEEE ICC 2014—Wireless Communications Symposium, pp. 5908-5913.
(Continued)

*Primary Examiner* — Iqbal Zaidi
(74) *Attorney, Agent, or Firm* — Leffler Intellectual Property Law, PLLC

(57) ABSTRACT

This disclosure provides a method, performed in a modulation and coding scheme, MCS module of a network node, for modulation and coding scheme, MCS, selection for a link between the network node and a terminal device in an orthogonal frequency division multiple access, OFDMA, based system. The OFDMA-based system provides a plurality of sub-carriers. The method comprises obtaining channel quality indicators for the plurality of sub-carriers, and estimating a link quality over a bandwidth corresponding to a set of the plurality of sub-carriers corresponding to a sub-channel based on the obtained channel quality indicators. The method comprises selecting a sub-channel out of
(Continued)

the plurality of sub-carriers as a new sub-channel to be used for a communication to/from the terminal device based on the determined link quality. The method comprises selecting a MCS for the new sub-channel; and transmitting information to the terminal device, the information comprising an indication of a new sub-channel to the terminal device.

27 Claims, 7 Drawing Sheets

(56) References Cited

U.S. PATENT DOCUMENTS

| | | | |
|---|---|---|---|
| 2009/0279498 A1* | 11/2009 | Li | H04L 1/0009 370/329 |
| 2010/0220682 A1 | 9/2010 | Tao et al. | |
| 2015/0085794 A1* | 3/2015 | Chen | H04B 7/0413 370/329 |

FOREIGN PATENT DOCUMENTS

| | | |
|---|---|---|
| EP | 1928193 A1 | 6/2008 |
| KR | 20080097507 A | 11/2008 |
| KR | 20080109311 A | 12/2008 |

OTHER PUBLICATIONS

Udesh Oruthota et al., Link Adaptation of Precoded MIMO-OFDMA System With I/Q Interference, IEEE Transactions on Communications, vol. 63, No. 3, Mar. 2015, pp. 780-790.
PCT International Search Report, dated Jun. 17, 2016, in connection with International Application No. PCT/EP2016/055475, all pages.
PCT Written Opinion, dated Jun. 17, 2016, in connection with International Application No. PCT/EP2016/055475, all pages.

\* cited by examiner

METHOD FOR MODULATION AND CODING SCHEME SELECTION AND RELATED NETWORK NODES AND TERMINAL DEVICES

TECHNICAL FIELD

The present disclosure relates to communication systems and in particular to modulation and coding scheme, MCS, selection in a network node and a terminal device.

BACKGROUND

Link adaptation usually refers to the ability to adapt a modulation and coding scheme, MCS, used for transmission of data to match channel conditions of a link used for the transmission. If a too high MCS is used (i.e. a too high modulation and/or a too high code rate), the error rate is likely to be too high, whereas if a too low MCS is used (i.e. a too low modulation and/or a too low code rate), the spectrum usage is likely to be unnecessarily low. Thus, using the most suitable MCS is highly desirable to make efficient use of the spectrum resources with a low error rate in most wireless communication systems.

In order for a transmitter to select a suitable MCS, the transmitter needs some kind of feedback from the receiver regarding the channel conditions. This feedback may be explicit, i.e., the receiver side may send back channel quality information, CQI, which can be used to determine the most suitable MCS on the current channel used, or the receiver may even send back information regarding which MCS estimate is the most suitable one for the transmitter to use on the current channel used. The feedback may also be implicit, e.g. the feedback may only be that correctly received packets are acknowledged whereas nothing is sent back in case the packet is not correctly received. In this latter case, the transmitter has to determine what a suitable MCS is based on the statistics of the correctly received packets, usually the packet error rate, PER. For example, if the PER is close to 0%, the transmitter may choose to increase the MCS, whereas if the percentage of correctly received packets is too small, the transmitter may choose to decrease the MCS.

In 802.11 standard, e.g. 802.11n and latest 802.11ac, the MCS and multiple input multiple output, MIMO, mode (either space time block code or spatially domain multiplexing) are calculated and recommended at terminals, herein referred to as stations, STA, side. The standard does not specify the technique by which the STA derives an MCS recommendation. Usually the recommendation criterion is to optimize the throughput or to guarantee sufficiently low PER to avoid unnecessary retransmission based on link quality. The MCS feedback field in the High Throughput, HT, Control field is used as a means for providing this feedback. The information of recommended MCS and MIMO mode is signaled to the network node, herein referred to as the access point, AP, through the MCS feedback field in the HT Control field. At the AP side, the AP combines the information about recommended MCS and other information it already has (e.g. transmit power amplifier backoff) to derive the final MCS and then the packet size for a downlink, DL, transmission.

One issue with link adaptation is that it requires the channel to be sufficiently slow varying. Specifically, the channel conditions for the next packet to be transmitted must be possible to determine so that a suitable MCS can be selected based on the earlier estimated channel conditions. In case of explicit feedback, the CQI provides, as such, limited value unless the transmitter uses the same settings as was used when the receiver generated the explicit feedback. In particular, if the transmission is done at another frequency channel, with potentially very different channel conditions, an MCS suggested by the receiver may be completely inadequate for the transmitter. Alternatively, if the CQI is varying very quickly due to e.g. intermittent interference, any link adaptation algorithm may have difficulty finding the optimum MCS.

In case of implicit feedback using packet error rate, PER, used in Wi-Fi, e.g. 802.11g, 802.11n, and 802.11ac, the issues may be even worse. Since PER is measured over a long period compared with the duration of one packet, link adaptation based on PER adapts slowly to time-varying channel conditions.

Orthogonal frequency division multiple access, OFDMA, has been adopted in LTE systems, where link adaptation including MCS selection and multiple user, MU, scheduling is performed simultaneously based on the CQI feedback from terminals. The goal is to maximize the overall throughput in the DL. Hence, the procedures of MCS selection and MU scheduling are coupled to optimize the overall performance. In the DL signaling, the information of the frequency resource allocation and MCS are carried in respective fields contained in DL. However, the link adaptation method used in LTE systems and existing optimization algorithms used for joint optimization may not be applicable to systems operating in an unlicensed band such as wireless local area network, WLAN, systems. In unlicensed band systems, MCS selection is mainly based on acknowledgement, ACK, and non-acknowledgment, NACK, and hence, it is not feasible to perform joint MU scheduling and link adaptation at AP. MU scheduling and link adaptation, to some extent, are decoupled.

In both uplink and downlink transmissions, the network node schedules different nodes, herein referred to as stations, STAs, in a part of the channel that has relatively good channel condition. However, as the channel changes with time, and the channel allocation to the different users typically varies with time, a link adaptation algorithm that is based on feedback from STA would typically have difficulties to perform timely adaptations. In such an OFDMA-based WLAN system, the AP is responsible for user allocation in the DL. Link adaption may still be based on the STA recommended MCS. In this procedure, when quality of the sub-carriers/sub-channel allocated to a certain STA degrades, the AP allocates a new link/sub-channel with possibly better quality. However, there is a considerable delay before the appropriate MCS for the new link/sub-channel is in place as the STA cannot know in advance what MCS is to be selected.

There is therefore a need for a mechanism that provides an efficient MCS selection that prepares for a sudden change in channel condition such as the sudden changes characterizing unlicensed bands.

SUMMARY

An object of the present disclosure is to provide a method which seeks to mitigate, alleviate, or eliminate one or more of the above-identified deficiencies in the art and disadvantages singly or in any combination.

This object is obtained by a method, performed in a modulation and coding scheme, MCS module of a network node, for modulation and coding scheme, MCS, selection for a link between the network node and a terminal device in an orthogonal frequency division multiple access, OFDMA, based system. The OFDMA-based system provides a plurality of sub-carriers. The method comprises obtaining channel quality indicators for the plurality of sub-carriers, and estimating a link quality over a bandwidth corresponding to a set of the plurality of sub-carriers corresponding to a sub-channel based on the obtained channel quality indicators. The method comprises selecting a sub-channel out of the plurality of sub-carriers as a new sub-channel to be used for a communication to/from the terminal device based on the determined link quality. The method comprises selecting a MCS for the new sub-channel where the change of MCS is at least partly based on the difference in channel quality on the previously used sub-carriers and the sub-carriers to be used for the next transmission; and transmitting information to the terminal device, the information comprising an indication of a new sub-channel to the terminal device.

Hereby, the present disclosure provides a MCS selection method that takes into account a change of sub-channel and allows the network node to adapt the MCS selection instantly when using a new sub-channel.

According to some aspects of this disclosure, the method further comprises using the selected MCS on the new, DL, sub-channel to the terminal device.

Advantageously, this disclosure provides clear benefits of immediately adapting DL communication in unlicensed bands where interferences are intermittent and unpredictable.

According to some other aspects, the information further comprises an indication of a new UL sub-channel from the terminal device; and the selected MCS for the UL new sub-channel from the terminal device STA1 60a.

Advantageously, this disclosure enables instant UL link adaptation when a new sub-channel is to be used in UL.

There is also disclosed herein a method, performed in a terminal device for a modulation and coding scheme, MCS, selection in a link between a network node and the terminal device in an orthogonal frequency division multiple access, OFDMA, based system. The OFDMA-based system provides a plurality of sub-carriers. The method comprises measuring a channel quality information for a set of sub-carriers corresponding to a sub-channel on which the terminal device transmits and/or receives, and/or on sub-carriers assigned to other terminal devices. The method comprises determining a channel quality indicator for the plurality of sub-carriers based on the measured channel quality information. The method comprises determining, based on the channel quality information, a MCS recommendation to be used on a currently used sub-channel to the network node and/or on at least one other sub-carrier to the network node; and transmitting the determined MCS recommendation and/or the determined plurality of channel quality indicators to the network node.

Thereby, the disclosed method performed at the terminal device can measure sub-carriers assigned to other terminal devices and thus enables the terminal device and/or the network node to instantly determine or select an optimal MCS on a new sub-channel out of the measured sub-carriers for UL and/or DL communications.

This disclosure also relates to a network node for modulation and coding scheme, MCS, selection for a link between the network node and a terminal device in an orthogonal frequency division multiple access, OFDMA, based system. The OFDMA-based system provides a plurality of sub-carriers. The network node comprises an interface, a memory module, and a MCS module. The MCS module is configured to obtain channel quality indicators for the plurality of sub-carriers, and estimate a link quality over a bandwidth corresponding to a set of the plurality of sub-carriers corresponding to a sub-channel based on the obtained channel quality indicators. The MCS module is configured to select a sub-channel out of the plurality of sub-carriers as a new sub-channel to be used for the communication to/from the terminal device based on the determined link quality, to determine a MCS for the new sub-channel where the change of MCS is at least partly based on the difference in channel quality on the previously used sub-carriers and the sub-carriers to be used for the next transmission; and to transmit information to the terminal device, the information comprising an indication of a new sub-channel to the terminal device.

The object is furthermore obtained by a terminal device for a modulation and coding scheme, MCS, selection in a link between a network node and the terminal device in an orthogonal frequency division multiple access, OFDMA, system, being configured with a plurality of sub-carriers. The terminal device comprises an interface, a memory module, a processing unit configured to measure a channel quality information for a set of sub-carriers corresponding to a sub-channel on which the terminal device transmits and/or receives, and/or on sub-carriers assigned to other terminal devices; and to determine a plurality of channel quality indicators for the plurality of sub-carriers corresponding to an entire bandwidth based on the measured channel quality information. The processing unit is configured to determine, based on the channel quality information, a MCS, recommendation to be used on a currently used sub-channel to the network node and/or on the other sub-carriers to the network node; and to transmit the determined MCS recommendation and/or the determined plurality of channel quality indicators to the network node.

The present disclosures also relates a computer program product for selecting a MCS, the computer program product comprising program code means adapted to perform, when executed on a processing unit of a terminal device, to cause the processing unit to perform the steps of the method disclosed herein.

The computer programs, the terminal devices and the network nodes, provide advantages corresponding to the advantages already described in relation to the respective methods.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

The present teaching relates to modulation and coding scheme selection for link adaptation in a wireless communication system.

Figure 1:
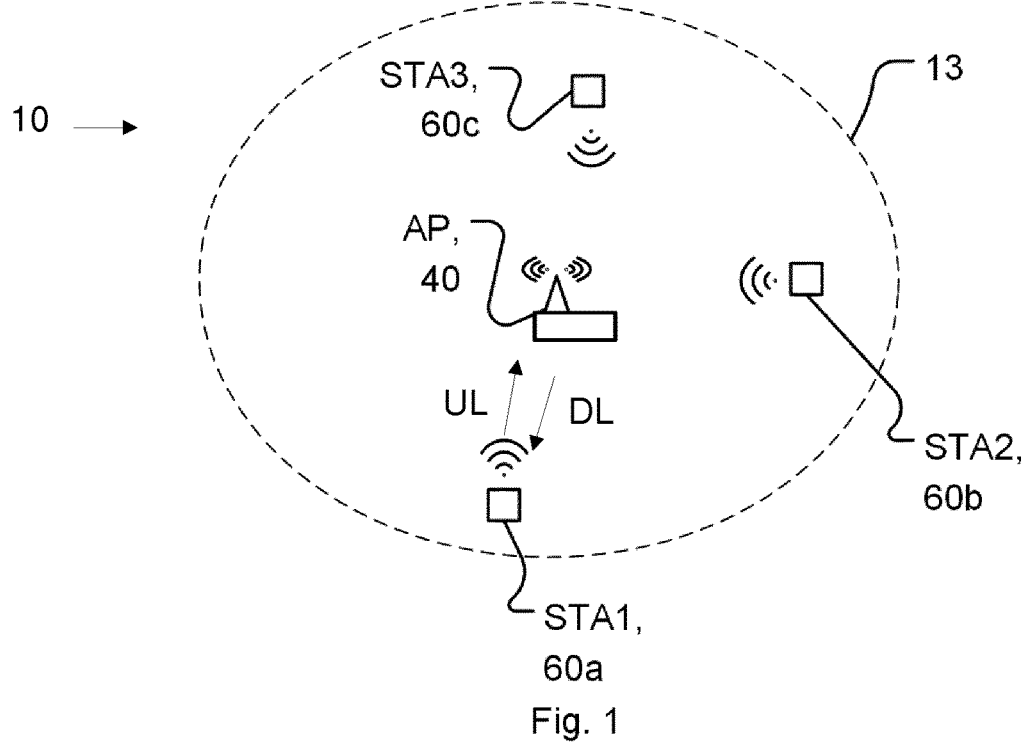
FIG. 1 is a schematic diagram illustrating a communication system according to the present disclosure.

FIG. 1 shows a schematic diagram illustrating a communication system 10 comprising an exemplary network node AP 40 and an exemplary terminal device, 60a according to some aspects of the present disclosure. The network node AP 40 provides network coverage to terminal devices 60a-c located within a coverage region 13 of the wireless network node AP 40. The communication system 10 comprises an orthogonal frequency division multiple access, OFDMA, based system providing a plurality of sub-carriers possibly covering an entire bandwidth, such as an entire frequency range. According to some aspects, the terminal device 60a-c connects with the communication system 10 via the network node AP 40. The network node AP 40 is configured to communicate over a coverage area 13 with the one or more terminal devices, STA1 60a, STA2 60b, STA3 60c via a wireless communication interface. The network node AP 40 is configured to have optionally a wired communication interface. The network node AP 40 forms part of a communication system such as an enterprise network, and/or a local area network. According to some aspects, the communication system comprises a wired communication system, and/or a wireless communication system. A wired communication system comprises e.g. an Internet protocol-based communication system, a fiber-optic communication system, a telephone network, and/or a cable network. A wireless communication system comprises for example a short range communication system (e.g. Bluetooth, ZigBee, near field communication, IEEE 802.15), a wireless local area network, WLAN (e.g. IEEE 802.11 standards).

Currently, in existing IEEE 802.11 standards with time division duplex, the uplink (UL; the links from the terminal devices 60a-c towards the network node AP 40) and the downlink (DL; the link from the network node AP 40 towards the terminal devices 60a-c) use the same channel, but not at the same time.

As mentioned in the background section, adopting orthogonal frequency division multiple access, OFDMA, would enable the network node AP 40 to transmit to several devices simultaneously, as well as in the up-link, UL so as to enable several terminal devices to transmit to the network node simultaneously. Additionally, adopting OFDMA in WLAN provides the possibility to introduce frequency selective scheduling, FSS. In both uplink and downlink transmissions, the network node AP 40 schedules the different terminal devices 60a-c, herein referred to as stations, STA1-3, in a part of the channel that has relatively good channel condition. This, in principle, can achieve FSS gain. In other words, FSS gain is achieved by allocating a user adjacent subcarriers located within e.g. a subband of a narrow bandwidth having the most favorable channel conditions among other subbands in the entire frequency band.

However, as the channel changes in time due to scheduling and unexpected interferences of the unlicensed band, allocation of the parts of the channel to the terminal devices 60a-c also varies in time, then a link adaptation algorithm based on implicit feedback present difficulties. Namely, in an OFDMA based WLAN system, where the network node AP 40 is responsible for resource allocation to terminal devices 60a-c in DL and performs DL link adaptation based on MCS recommended by the terminal devices STA1-3 60a-c or based on statistics of correctly received packets, the AP 40 performing a sub-channel change has to wait for the STA1 to adapt to the new sub-channel and converge towards the optimal MCS to be recommended to the AP 40 or has to wait to obtain sufficiently reliable statistics before the AP 40 can fully benefit from the sub-channel change by using the optimal MCS selection. This is due to the fact that a terminal device STA1 60a in communication with AP 40 presently cannot recommend MCS on sub-channels allocated to other terminal devices STA2-3 60b-c. This leads to considerable delay when the terminal device STA1 60a is assigned a new sub-channel and needs to perform measurement on the new sub-channel and recommend MCS on this new sub-carrier. Therefore, AP 40 needs a new mechanism such that when sub-channel scheduling due to change in channel condition is expected, a proper MCS can be adjusted much before the terminal device STA1 60a has converged to the optimal MCS to recommend.

The present disclosure provides methods, and network nodes that enable the AP 40 to immediately select the optimal MCS when a new sub-channel is allocated by allowing the network node AP 40 to obtain channel quality indicators for the plurality of sub-carriers and derive a link quality for a plurality of sub-channels corresponding to e.g. (substantially) the entire bandwidth. The present disclosure provides methods, and terminal devices that enable the terminal device STA1 60a to measure and determine channel quality indicators for the plurality of sub-carriers and to derive an MCS recommendation for the plurality of sub-carriers including sub-carriers assigned to other terminal devices STA2-3 60b-c quality for assessing substantially the entire bandwidth. This disclosure provides an efficient link adaptation when channel conditions vary considerably due to the unlicensed band being prone to intermittent interference from e.g. medical devices, microwave ovens, etc. . . . .

Frequency selective scheduling is usually based on the availability of channel quality information over all sub-carriers for potential terminal devices STAs. Such channel quality information can be obtained through explicit or implicit feedback from the terminal devices STAs as well as uplink measurement assuming DL/UL reciprocity. A form of channel quality information can range from full knowledge of channel state to simply SNR values.

The AP 40 makes for example a decision on MCS by considering MCS recommendation from the terminal device STA1 and transmitter parameters, e.g., transmit power amplifier backoff. The present disclosure proposes a link adaptation i.e. the procedure of MCS selection, that takes into account the frequency scheduling result and the consequent channel state change for each terminal device STA1 60a because of transmission on different set of sub-channels. Given a sub-channel allocation to each terminal device, when the current MCS or MCS recommendation from the terminal device STA1 60a is not suitable for the expected channel condition, e.g. too high MCS for expected bad channel condition or vice versa, the MCS can be immediately re-selected based to the expected channel condition according to the present disclosure.

In this disclosure, the term "terminal device" used herein refers to a device that has wireless communication capabilities as well as memory and computational capabilities. A terminal device is for example user equipment, and/or a relay node. A terminal device is for example a mobile terminal, or a fixed terminal. A terminal device may be a device comprising a universal integrated circuit card configured to communicate. The terminal devices may be any combination of mobile stations, STAs, mobile phones, handsets, wireless local loop phones, smartphones, laptop computers, tablets and computers. The terminal devices are configured to communicate with the network node using one or more of the sub-carriers from the plurality of sub-carriers provided in the communication system.

In this disclosure, the term "network node" used herein refers to a node or equipment that is attached and belongs to a network or network infrastructure, and that has communication capabilities as well as memory and computational capabilities that support creating, receiving, and/or transmitting information over one or more communications channels. The network node is configured to communicate with terminal devices using one of the sub-carriers from the plurality of sub-carriers provided by the communication system. The network node comprises, according to some aspects, a gateway and/or a network node of WLAN network, such as a WLAN access point, a WLAN ad hoc node and a WLAN relay node.

In the currently contemplated new 802.11 standard for OFDMA, there may be a number of sub-carriers, say 256, and a number of sub-channels, say 9, each containing 26 sub-carriers. Some sub-carriers are not used, e.g. at the edges, which is why 9*26=234<256. Here, a sub-channel between an AP 40 and a mobile terminal STA is also referred to as a link (or generally just channel). The bandwidth available to an AP 40 may be divided into a number of sub-channels depending on the bandwidth allocated to them.

Figure 2A:
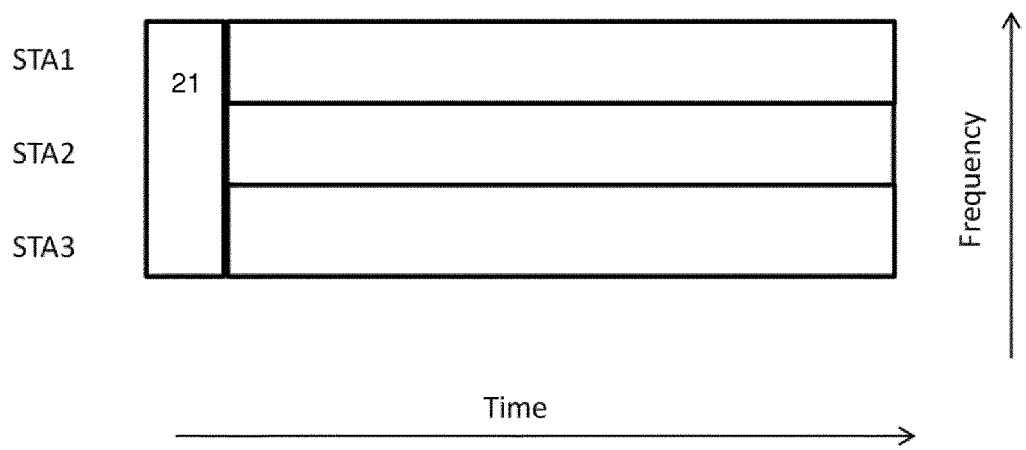
FIG. 2a-b are schematic diagrams illustrating an exemplary DL packet structure according to some aspects of the present disclosure.
Figure 2B:
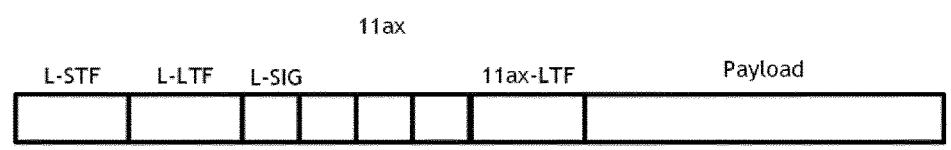

FIG. 2a-b are schematic diagrams illustrating an exemplary DL packet structure according to some aspects of the present disclosure. A part 21 of the packet contains data used by all terminal devices, such as all three stations STA1, STA2, STA3. Example of such part 21 is control data such as known sequences used for synchronization etc., as well as information about what sub-carriers are allocated to respective terminal devices. Consider, as a non-limiting explanatory example, that the communications network 10 is using parameters similar to Wi-Fi, IEEE 802.11. Consider, as a non-limiting explanatory example, that the considered bandwidth is 20 MHz and that three terminal devices 60a-c are associated to one network node AP 40, as illustrated in FIG. 1. In a non-limiting explanatory example, a 64 point FFT is used for a 20 MHz wide channel. It is assumed that OFDMA is supported. An additional field in the part 21 is used to indicate which of the terminal devices 60a-c receives data and what sub-carries are used for respective terminal devices to receive data. The control data is preferably self-contained in every 5 MHz sub-channel containing a number of sub-carriers and simply repeated in every sub-channel as this would allow the reception of the control data using only a 5 MHz receiver.

FIG. 2b provides a more detailed illustration of an exemplary control data 21 of FIG. 2a. The packet comprises a first section, a second section and a payload. A first section of the packet comprises the legacy control data, i.e. Legacy-Short Training Field L-STF, Legacy-Long Training Field L-LTF, and Legacy-Short Signal Field L-SIG, which can be used by legacy terminal devices to properly defer from transmission. A second section of the packet comprises, among other things, control information necessary for OFDMA such as a preamble and 11ax Long Training Field, 11ax-LTF. It is here envisioned that terminal devices supposed to receive data in the payload are able to demodulate the second section. Based on information in the second section, the terminal devices 60a-c are able to know whether there is data for them in the packet and also on which sub-carriers to find their respective data. Data to a terminal device 60a can for instance be sent on one of a predetermined plurality of sub-channels, such as one out of 3 sub-channels for the three terminal devices 60a-c as illustrated in FIG. 2a. However, it could also envisaged that the plurality of sub-carriers allocated to a sub-channel may be varied to make scheduling more effective, and it may also be so that a sub-channel does not consist of contiguous sub-carriers but rather of sub-carriers spread of the entire bandwidth in order to provide for better frequency diversity.

Figure 3:
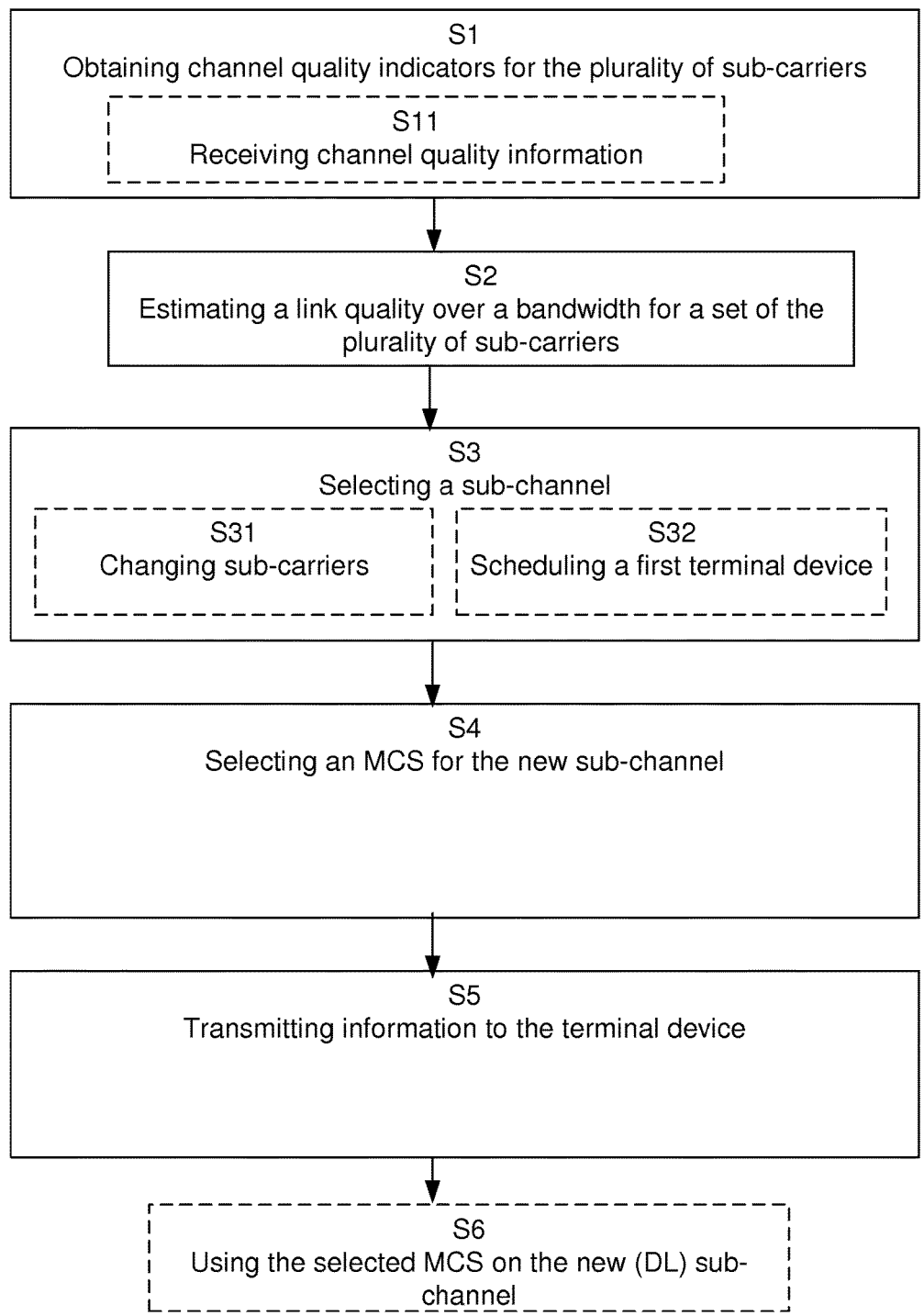
FIG. 3 is a flowchart illustrating methods performed in a network node according to some aspects of this disclosure.

FIG. 3 is a flow-chart illustrating embodiments of methods performed by the network node AP for modulation and coding scheme, MCS, selection for a link between the network node AP 40 and a terminal device STA1 60a in a communication network 10 such as in an orthogonal frequency division multiple access, OFDMA, based system providing a plurality of sub-carriers. The methods are performed in a MCS module 43 (shown in FIG. 4) of a network node AP 40. The method comprises obtaining S1 channel quality indicators for the plurality of sub-carriers, possibly corresponding to all sub-carriers covering/corresponding to an entire bandwidth available to or used by the network node AP 40, such as an entire frequency range available to or used by the network node AP 40. The network node AP 40 advantageously holding channel quality indicators for all the sub-carriers benefits from more flexibility in allocating possible sub-carriers and an associated sub-channel with an improved link quality to terminal devices. According to some aspects, the step of obtaining S1 channel quality indicators comprises receiving S11 a channel quality information, CQI, from the terminal device STA1 60a of the entire bandwidth on which the terminal device STA1 60a transmits or receives, and/or on the sub-carriers assigned to other terminal devices STA2 60b, STA3 60c. In other words, the network node AP 40 receives CQI for the entire bandwidth, i.e. the total bandwidth used by the network node AP 40 for transmission to the terminal devices 60a-c or the total bandwidth of the OFDMA based system. Optionally, the channel quality information includes a recommended MCS for the sub-carriers on which the network node AP 40 transmits and/or on the sub-carriers assigned to other terminal devices STA2 60b, STA3 60c. The MCS is recommended by the terminal device sending the channel quality information. Compared to the single-user case where the terminal device 60a recommends a single MCS, in a OFDMA case, the terminal device 60a needs not only to feedback the recommended MCS on the sub-carriers it transmits/receives on, but also the sub-carriers assigned to other terminal devices 60b-c by measuring the channel quality on a control channel that spreads over the entire bandwidth. Alternatively or additionally, the terminal device STA1 60a only sends for example a recommended MCS for the current sub-channel/sub-carriers and one or more additional MCS for one more additional sub-carriers. Alternatively, the terminal device STA1 60a may send the recommended MCS for the currently used sub-channel and in addition send information about what sub-carriers cannot be used with the current MCS as a means to indicate for the AP 40 what sub-carriers are particularly poor for the terminal device STA1 60a.

The method comprises estimating S2 a link quality over a bandwidth (preferably over an entire bandwidth) corresponding to the plurality of sub-carriers based on the obtained channel quality indicators. For example, the network node AP 40 estimates the link quality of the plurality of sub-carriers corresponding to the (possibly entire or substantially entire) bandwidth used by/available to the network node AP 40 by determining, based on the obtained CQI, a link/channel quality for each of the plurality of sub-carriers used by/available to the network node AP 40 and possibly averaging the link qualities over all sub-carriers. Particularly, the channel quality for a sub-channel is useful. If the sub-channel comprises e.g. a set of 26 sub-carriers, this can be achieved by obtaining a channel quality metric for each of the 26 sub-carriers, or as a single average, or as weighted metric in between. The estimated link quality comprises for example a signal to noise ratio, SNR, a channel gain, and/or a SNR-MCS mapping table. Selecting S4 is for example performed using the SNR-MCS mapping table. In one or more embodiments, the network node AP 40 occasionally schedules the terminal device STA1 60a to another sub-channel, or potentially over the full band, as a means for the network node AP 40 to occasionally estimate the link quality of the plurality of available sub-carriers present in the full band and then use the link quality in subsequent frequency selective scheduling and MCS selection.

The method comprises selecting S3 a sub-channel out of the plurality of sub-carriers as a new sub-channel to be used for a communication to/from the terminal device STA1 60a based on the determined link quality. For example, the network node AP 40 selects a sub-channel benefiting from better link conditions than the currently used sub-carriers, such as a higher SNR and/or a higher channel gain. This results in an efficient application of frequency selective scheduling which provides significant advantages in an unlicensed band where sudden interferences may appear unexpectedly.

The method comprises selecting S4 an MCS for the new sub-channel. Selecting an MCS results in a possible change of MCS from the previously used MCS. MCS selection is at least partly based on a difference in link quality between the previously used sub-carrier and the sub-new carrier to be used.

The method comprises transmitting S5 information to the terminal device STA1 60a, the information comprising an indication of a new sub-channel to the terminal device STA1 60a. For example, the network node AP 40 informs the terminal device STA1 on which sub-carriers the upcoming DL transmission is going to take place. To adapt the UL communication, the information further comprises for example an indication of a new UL sub-channel from the terminal device STA1 60a; and the selected MCS for the UL new sub-channel from the terminal device STA1 60a. This way, the terminal device STA1 is able to change to the new UL sub-channel and adapt immediately the MCS to the selected MCS which is likely to be the most optimal MCS to choose, thereby reducing any delay into performing link adaptation and thus benefiting immediately from the sub-channel change. In an illustrative UL example, the terminal device STA1 60a sends a request of MCS feedback to AP 40 and then the AP 40 sends the information about MCS selection to STA1 60a. When the AP 40 senses that the link quality of some terminal device's uplink channel degrades quickly, the AP 40 can send out a new MCS selection (e.g. lower MCS) without waiting for STA1's MCS request. When frequency selective scheduling, FSS, is used in the UL (i.e. allocating a STA an UL sub-carrier having a defined bandwidth and the most favorable channel conditions among other sub-carriers in the entire frequency band) and each STA is allocated to its own sub-channel, the AP 40 does not have knowledge of the channel quality of the sub-carriers allocated to other STAs. The AP 40 can decide to allocate another sub-channel for UL transmission when it determines that the currently used one becomes worse than e.g. a predetermined threshold (in terms of e.g. power, SNR, SINR, etc.).

In one or more embodiments, the method further comprises using S6 the selected MCS for the new DL sub-channel to the terminal device STA1 60a, such as for a following transmission to the terminal device STA1 60a. For example, the network node AP 40 transmits a packet in DL to the terminal device STA1 60a on the new DL sub-channel selected and using the selected MCS.

In one or more embodiments, the channel quality information from the terminal device STA1 60a for sub-carriers not allocated to the terminal device STA1 60a uses an index offset value related to the modulation and coding scheme on the same sub-carrier. For example, when a sub-carrier is changed, the MCS is changed using an index offset instead of a MCS index. Thus, for example, if the link is degraded of 5 dB which may correspond to two steps down in MCS selection, the terminal device sends an index of −2 to the AP. The channel quality information about the other sub-carries may be provided as index offsets for all other possible sub-carriers.

According to some aspects, the channel quality information includes information about noise limitation or information about interference limitation. The noise limitation is for example indicative of the noise floor on the link while the interference limitation is for example indicative of an interference level on a given sub-channel/sub-carrier, or the presence of an interference source on a given sub-channel/sub-carrier. Selecting S4 an MCS comprises for example selecting a less robust MCS when the link is interference limited. For example, the network node AP 40 determines that a link is interference limited based on whether a link quality indicator (e.g. total received power, signal to noise ratio, SNR, signal to interference and noise ratio, SINR) is above a threshold and considered high, and that the decoding is still not successful, and selects a less robust MCS (i.e. a higher or faster MCS, and MCS indexed by a higher index) to generate a packet that takes a shorter time to transmit and thus increases the likelihood of successful transmission in an interference limited link. Selecting S4 an MCS comprises for example selecting a more robust MCS (i.e. a lower or slower MCS, and MCS indexed by a lower index) when the link is noise limited. For example, the network node AP 40 determines that a link is noise limited when the received signal simply is considered below a threshold and considered too weak in terms of amplitude, power etc. . . . .

According to some aspects, selecting S3 a sub-channel comprises changing S31 sub-carriers for a plurality of terminal devices STA1 60a, STA2 60b, STA3 60c subjected to different interference limitations, and scheduling S32 a first terminal device STA1 60a of the plurality of terminal devices, which is subjected to a relatively higher interference limitation, on a sub-channel that has more favorable channel conditions (i.e. that provides or exhibits a higher SNR), and adapted with less robust MCS, such as a higher or faster MCS. Thereby, the sub-carriers are possibly changed and re-assigned based on conditions on the links. For example, assuming that a desired signal is over 40 MHz, a first 20 MHz of the link are severely interfered, whereas a second 20 MHz of the link are not so interfered, the network node AP 40 changes sub-channels for a plurality of terminal devices STA1 60*a*, STA2 60*b*, STA3 60*c* subjected to different interference limitations on the first 20 MHz, and schedules a first terminal device STA1 60*a* of the plurality of terminal devices in the second 20 MHz. Additionally or alternatively, in a situation where both terminal devices STA1 60*a* and STA2 60*b* would prefer the first and same part of the link to get as high MCS as possible, if the sub-channel to/from the terminal device STA1 60*a* is prone to interferences whereas the sub-channel to/from the terminal device STA2 60*b* is not, the network node AP 40 gives priority to the terminal device STA1 60*a*. This may be advantageous if the terminal device STA1 60*a* can use a high MCS to obtain short packets, thereby reducing the probability for being hit by interference. Selecting S3 a sub-channel comprises for example scheduling on a sub-channel that has more favorable channel conditions a terminal device STA1 60*a* of the plurality of terminal devices, for which a probability of being interfered is the highest amongst the terminal devices.

In one or more embodiments, obtaining S1 channel quality indicators further comprises performing implicit channel sounding by measuring interleaved pilots contained in an ACK frame. For example, the network node AP 40 performs implicit channel sounding by measuring pilots present in a control data of the ACK frame, such as the LTF/STF fields, 11ax-LTF of FIG. 2*b*. That is, instead of receiving explicit signals from the terminal device about the channel quality, the AP 40 performs measurements directly on the available pilots on the plurality of sub-carriers. In this case, the network node AP 40 understands the channel variation much faster than through feedback of STA recommendation. Hence, the network node AP 40 relies on the implicit channel sounding and adjusts the MCS selection before STA recommendation can really reflect channel variation. In one or more embodiments, the above MCS selection is triggered by a metric to measure channel state variation. For example, when expected SNR or channel gain drops or rises quite much, a SNR-MCS mapping table can be used for fast MCS selection rather than the PER-based MCS selection which would respond slowly.

Figure 3A:
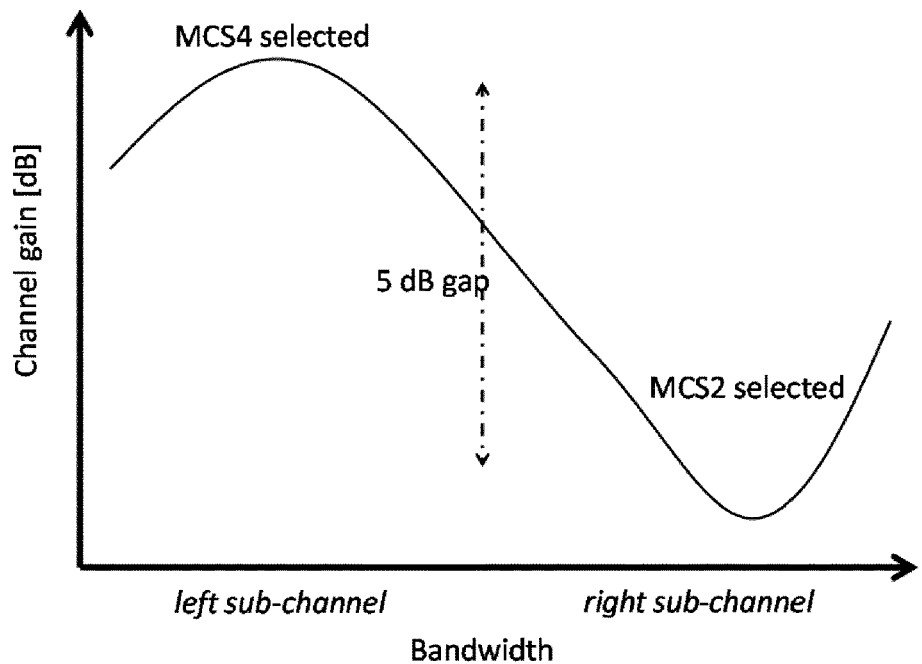
FIG. 3a schematically illustrates how frequency selective fading affects the MCS selection.

FIG. 3*a* schematically illustrates how frequency selective fading affects the MCS selection. Frequency selective fading results in channel impairments for which different MCS are used in different parts of the channel. FIG. 3*a* shows a channel gain in the AP-STA1 DL channel or link over a set of available frequencies. In this example, for the sake of simplicity, we assume that the channel gain in FIG. 3*a* is "quasi-constant" for an interval of time during which multiple DL packet transmissions can occur, e.g. in block-fading channel. Nevertheless, it should be noted that this procedure relies on the sole assumption that channel gain information is available (to the disclosed method) on the frequencies allocated (by the sub-channel/sub-carrier selection). Therefore the quasi-constant property of the channel is not a necessary condition for disclosed method to work. Suppose that initially the network node AP 40 has selected the left sub-channel in FIG. 3*a* to be used for DL transmission to terminal device STA1 60*a* and that the network node AP 40 has found that MCS4 is suitable. Suppose that suddenly the network node AP 40 selects the right sub-channel in FIG. 3 for DL communication to terminal device STA1 60*a* and that the channel gain can be still represented as in FIG. 3*a*. Assume the right sub-channel has 5 dB worse expected SNR. Furthermore, suppose that each step in MCS corresponds to about 2.5 dB, so that for every 2.5 dB increase in SNR it is possible to increase the MCS by one step. Now, according to the present disclosure, the network node AP 40 switches from MCS4 to MCS2 to take the impact of sub-channel change (i.e., switching from right to left sub-channel in FIG. 3*a*) into account. Without taking sub-channel change into account, the link adaptation would adapt slowly to the new channel conditions and would eventually reach MCS2 after a number of erroneous packets transmitted at too high MCS. By combining the sub-channel selection with the MCS selection, a number of unnecessary retransmissions are avoided. The information from sub-channel change is also useful in case the change of channel would be to a channel with a higher SNR (in FIG. 3*a* this would correspond to the case where the network node AP 40 switches carrier utilization from right to left sub-channel). In this case the network node AP 40 with the disclosed link adaptation is able to immediately adjust to a larger MCS without waiting for a number of correctly received packets using a MCS that would be unnecessarily low.

Figure 3B:
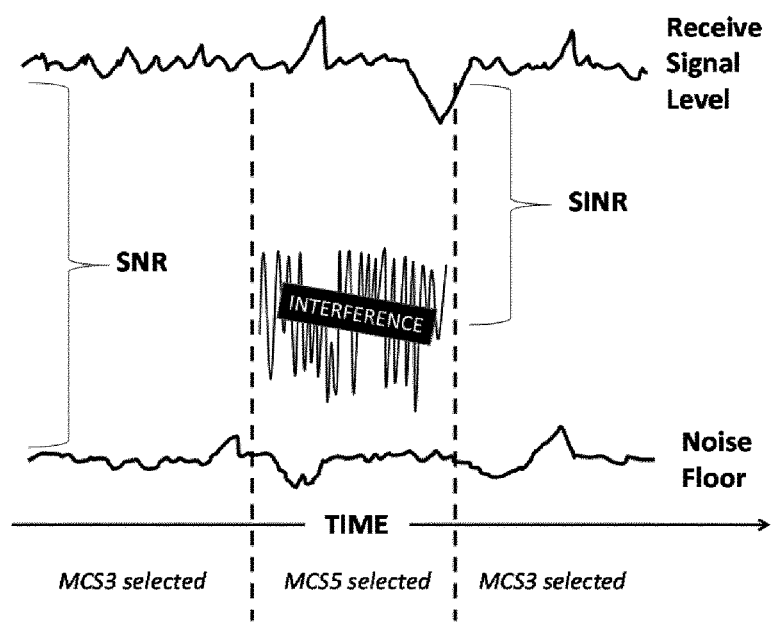
FIG. 3b schematically illustrates how a channel quality can suddenly change depending on whether interference is present or not

FIG. 3*b* schematically illustrates how a channel quality information can suddenly change depending on whether interference is present or not. In one or more embodiment, more than one MCS selection method (or link adaptation technique) is used, however only one MCS selection method is active at a time depending on the link conditions. Specifically, according to some aspects of this disclosure, the network node AP 40 uses one MCS selection method in case the link is determined to be noise limited, and another MCS selection method in case the link is determined to be interference limited. FIG. 3*b* shows a received signal power, a noise level and an interference level (as a function of time) at STA1 60*a* during a DL transmission from the AP 40. FIG. 3*b* shows that initially the link is noise limited and MCS3 is selected by the MCS selection method. After some time, interference is detected, due to e.g. a concurrent network node's transmission, and the AP 40 realizes that the channel has become interference limited. Then the AP 40 takes advantage of this information and immediately chooses MCS5 according to an MCS selection method of the AP 40 activated in presence of interference. In case of a noise limited link, the MCS selection method of the AP 40 changes to a more robust/slower/lower MCS when a packet/frame error rate is found to be too high. In case the link is interference limited, the MCS selection method changes to a less robust/faster/higher MCS. Changing to a less robust MCS allows the same amount of data to be transmitted in a shorter period of time and thereby reduces the probability that the packet is hit by interference. In case the MSC selection is based on a recommendation from the STA1 60*a*, the STA1 60*a* making this recommendation may in addition to the MCS selection indicate e.g. by one bit, whether interference was present so that this can be taken into account at the network node AP 40. Additionally, this embodiment may optionally be combined with the FSS and the corresponding feedback so that if the terminal device STA1 60*a* sends back a recommendation of a suitable MCS to the network node AP 40, the terminal device STA1 60*a* sends additional information regarding whether some sub-carriers are less interfered back to the network node AP 40. Feedback regarding relative interference on different sub-carriers may be transmitted as an index relative to a currently used sub-carrier, for example in a similar way as performed for providing index-based feedback on MCS recommendation.

Figure 4A:
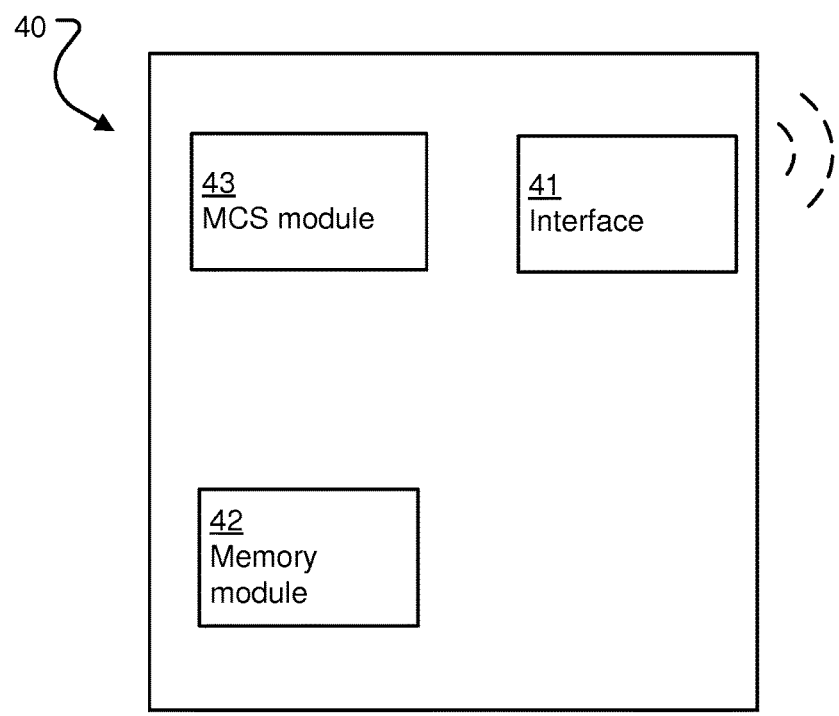
FIG. 4a is a block diagram illustrating a network node according to some aspects of the present disclosure.

FIG. 4a is a block diagram illustrating an exemplary network node 40 according to aspects of this disclosure. FIG. 4a shows an exemplary network node 40, in terms of a number of functional units and shows the components or modules of a network node 40 according to an embodiment. The network node AP 40 is configured to select a modulation and coding scheme, MCS, for a link between the network node 40 and a terminal device 60a in an orthogonal frequency division multiple access, OFDMA, based system providing a plurality of sub-carriers. The network node 40 comprises a modulation and coding scheme, MCS, module 43 and a memory module 42. The MCS module 43 comprises for example a processing unit using any combination of one or more of a suitable central processing unit, CPU, multiprocessor, microcontroller, digital signal processor DSP, application specific integrated circuit, ASIC, field programmable gate arrays, FPGA etc., capable of executing software instructions stored in a computer program product, e.g. in the form of a storage medium or memory module 42. Thus the processing unit is thereby arranged to execute methods disclosed herein. The memory module 42 may also comprise persistent storage, which, for example, can be any single one or combination of magnetic memory, optical memory, solid state memory or even remotely mounted memory. The network node 40 further comprises an interface 41 for communication with at least one terminal device 60a-c, another network node, and/or a core network. As such the interface 41 may comprise one or more transmitters and receivers for wireless and/or wireline communications. A processing unit controls the general operation of the network node 40 e.g. by sending data and control signals to the interface 41 and the memory module 42, by receiving data and reports from the interface 41, and by retrieving data and instructions from the memory module 42. Other components, as well as the related functionality, of the network node 11 are omitted in order not to obscure the concepts presented herein.

The MCS module 43 is configured to obtain channel quality indicators for the plurality of sub-carriers. The network node AP 40 or MCS module 43 advantageously holding channel quality indicators for all the sub-carriers benefits from more flexibility in allocating possible sub-carriers and an associated sub-channel with an improved link quality to terminal devices. According to some aspects, the MCS module 43 is configured to obtain channel quality indicators by receiving a channel quality information from the terminal device STA1 60a of the entire bandwidth on which the terminal device STA1 60a transmits and/or receives, and/or on the sub-carriers assigned to other terminal devices STA2 60b, STA3 60c shown in FIG. 1. For example, the channel quality information includes information about noise limitation or information about interference limitation. In other words, the network node AP 40 or MCS module 43 receives CQI for the entire bandwidth, i.e. the total bandwidth used by the network node AP 40 for transmission to the terminal devices 60a-c. Optionally, the channel quality information includes a recommended MCS for the sub-carriers on which the network node AP 40 transmits and/or on the sub-carriers assigned to other terminal devices STA2 60b, STA3 60c.

The MCS module 43 is configured to estimate a link quality preferably over a bandwidth corresponding to the plurality of sub-carriers based on the obtained channel quality indicators. For example, the MCS module 43 is configured to estimate link quality of substantially the entire bandwidth used by the network node 40. Alternatively or additionally, for example, the MCS module 43 estimates the link quality of the plurality of sub-carriers corresponding to the entire bandwidth used by the network node AP 40 by determining, based on the obtained CQI, a link/channel quality for each of the plurality of sub-carriers and possibly averaging the link qualities over all sub-carriers. The estimated link quality comprises for example a signal to noise ratio, SNR, a channel gain, and/or a SNR-MCS mapping table. Selecting S4 is for example performed using the SNR-MCS mapping table.

The MCS module 43 is configured to select a sub-channel carrier out of the plurality of sub-carriers as a new sub-channel to be used for the communication to/from the terminal device STA1 60a based on the determined link quality.

The MCS module 43 is configured to select a MCS for the new sub-channel. For example, the MCS module 43 selects a sub-channel benefiting from better link conditions than the currently used sub-carriers, such as a higher SNR; a higher SINR, and/or a higher channel gain. The MCS module 43 selects the MCS for the new sub-channel partly based on e.g. a difference in link quality between the previously used sub-carriers and the sub-new carriers to be used. This results in an efficient application of frequency selective scheduling which provides significant advantages in an unlicensed band where sudden interferences may appear unexpectedly.

The MCS module 43 is configured to transmit information to the terminal device STA1 60a, the information comprising an indication of a new sub-channel to the terminal device STA1 60a. For example, the MCS module 43 informs via the interface 41 the terminal device STA1 60a on which sub-carriers the upcoming DL transmission is going to take place.

Figure 4B:
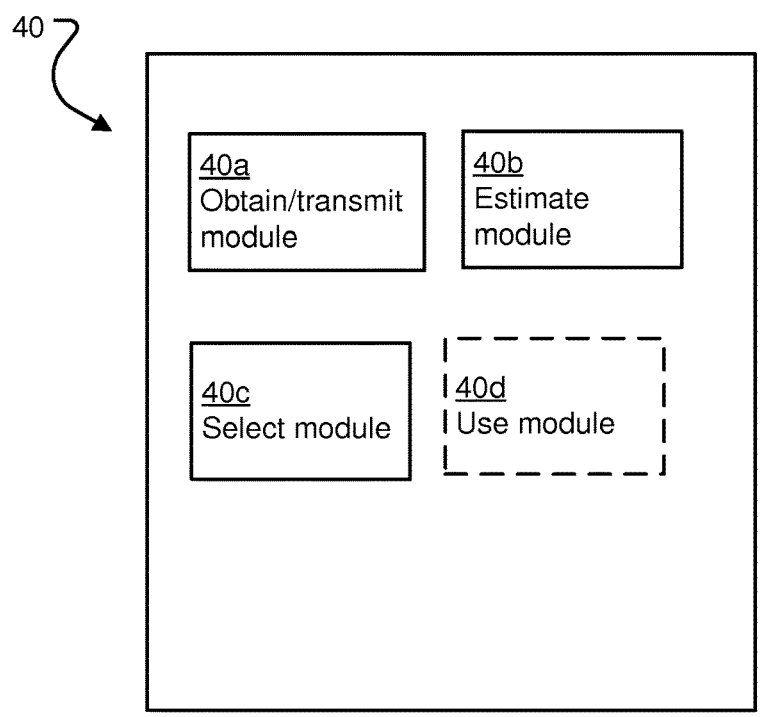
FIG. 4b is a schematic diagram showing functional units of a network node according to an embodiment.

FIG. 4b is a schematic diagram showing functional units or the components of a network node 40 according to an embodiment. The network node 40 of FIG. 4b comprises a number of functional modules; a obtain/transmit module 40a configured to perform below steps S1, and S5, an estimate module 40b configured to perform step S2, a select module 40c configured to perform steps S3, S4. The network node 40 of FIG. 4b may further comprise a number of optional functional modules, such as any of a use module 40d configured to perform steps S6. The functionality of each functional module 40a-d will be further disclosed in the context of which the functional modules 40a-d may be used. In general terms, each functional module 40a-d may be implemented in hardware or in software. Preferably, one or more or all functional modules 40a-d may be implemented by a processing unit, possibly in cooperation with functional units 43, 41 and/or 42 of FIG. 4a. The processing unit may thus be arranged to from the memory module 42 fetch instructions as provided by a functional module 40a-d and to execute these instructions, thereby performing any steps as will be disclosed hereinafter.

According to some aspects, the MCS module 43 is configured to transmit further information to the terminal device STA1, 60a. The further information comprises an indication of a new UL sub-channel from the terminal device STA1, 60a and the selected MCS for the UL new sub-channel from the terminal device STA1, 60a. This way, the terminal device STA1 is able to change to the new UL sub-channel and adapt immediately the MCS to the selected MCS which is likely to be the most optimal MCS to choose, thereby reducing any delay into performing link adaptation and thus benefiting immediately from the sub-channel change.

In one or more embodiments, when the link is interference limited, the MCS module 43 is configured to change of MCS to a less robust MCS, while when the link is noise limited, the MCS module 43 is configured to change the MCS to a more robust MCS (i.e. a slower or lower MCS, an MCS with a lower index). The noise limitation is for example indicative of the noise floor on the link while the interference limitation is for example indicative of an interference level on a given sub-channel/sub-carrier, or the presence of an interference source on a given sub-channel/sub-carrier. For example, the MCS module 43 determines that a link is interference limited based on whether a link quality indicator (e.g. total received power, signal to noise ratio, SNR, signal to interference and noise ratio, SINR) is above a threshold and considered high, and that the decoding is still not successful, and selects a less robust MCS to generate a packet that takes a shorter time to transmit and thus increases the likelihood of successful transmission in an interference limited link. The MCS module 43 determines for example that a link is noise limited when the received signal simply is considered below a threshold and considered too weak in terms of amplitude, power etc. . . . . . The MCS module 43 is for example configured to change sub-carriers for a plurality of terminal devices STA1 60*a*, STA2 60*b*, STA3 60*c* subjected to different interference limitations, and to schedule a first terminal device of the plurality of terminal devices STA1 60*a*, STA2 60*b*, STA3 60*c*, which is subjected to a relatively higher interference limitation, on a sub-channel that has more favorable channel conditions (e.g. a higher SNR), and adapted with less robust MCS (i.e. higher/faster MCS). In one or more embodiments, a duration of the packets to the different STAs is assumed similar. Different terminal devices may suffer from largely different interference conditions. Thus, in selecting sub-carriers for the plurality of terminal devices STA1 60*a*, STA2 60*b*, STA3 60*c* subjected to different interference limitations, the STAs having a higher probability of being hit by interference get priority in the sense that these STAs are prioritized for being scheduled on sub-carriers with good channel conditions so that the transmission time to these STAs can be made as short as possible. A simple example of this embodiment is as follows: two STA1 60*a* STA2 60*b* are associated with the AP 40 using a 20 MHz channel and the channel is divided into two 10 MHz sub-channels. For example, STA1 60*a* is interfered whereas STA2 60*b* is not. Now, suppose that both STA1 60*a* and STA2 60*b* would prefer to be scheduled in the lower 10 MHz sub-channel as for both STAs this sub-channel is better than the upper one. STA1 60*a* is scheduled in the lower (the best) sub-channel as it is considered more important that STA1 60*a* has higher MCS and thereby a shorter packet in order to avoid interference with higher probability.

Figure 5:
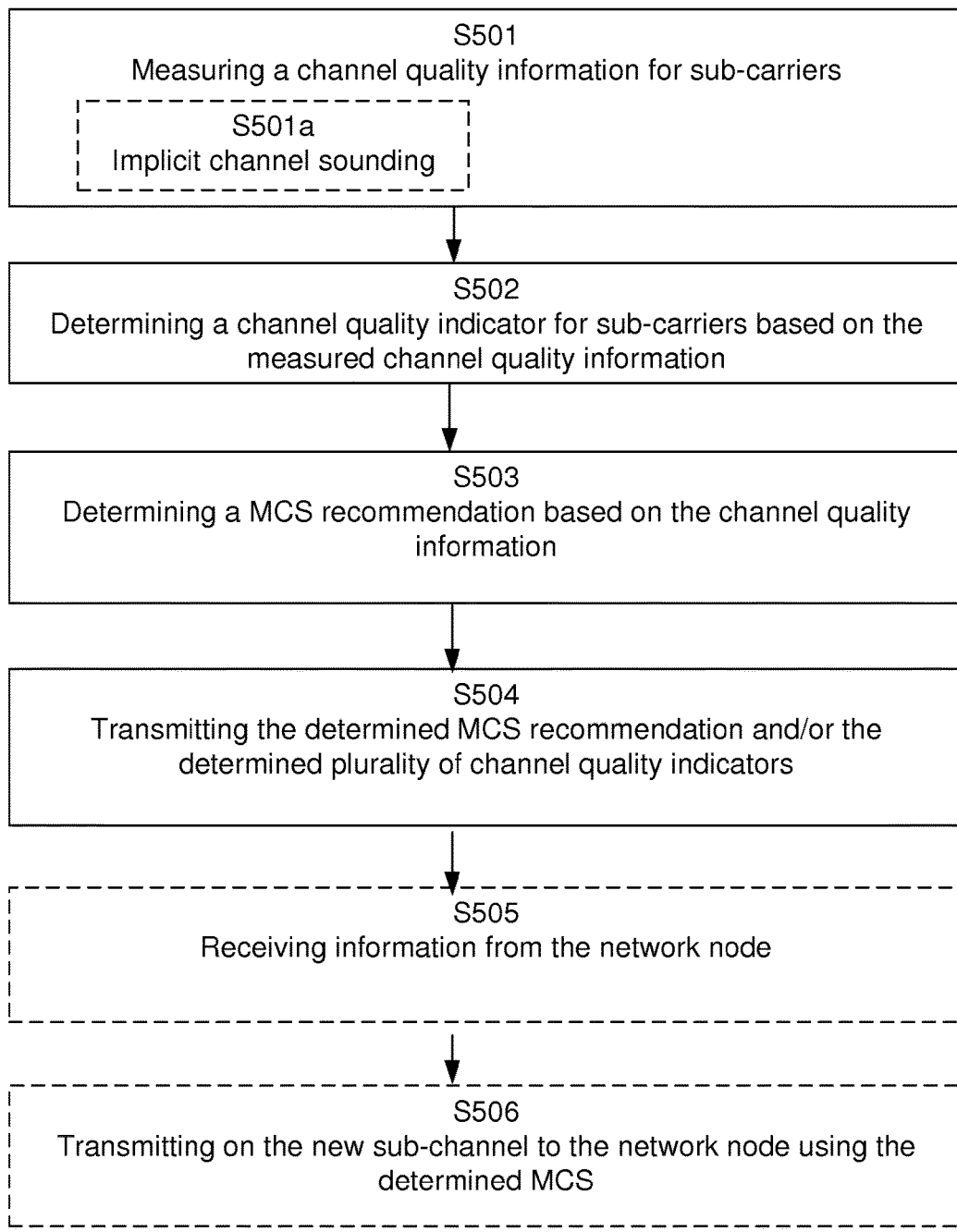
FIG. 5 is a flowchart illustrating methods performed in a terminal device according to some aspects of this disclosure.

FIG. 5 shows a flow-chart illustrating exemplary methods according to aspects of this disclosure. The methods are performed in a terminal device STA1 60*a*. The methods are, for a modulation and coding scheme, MCS, selection in a link between a network node AP, 40 and the terminal device STA1 60*a* in an orthogonal frequency division multiple access, OFDMA, based system. The OFDMA-based system provides a plurality of sub-carriers corresponding to a bandwidth, such as an entire bandwidth. Examples of such OFDMA-based systems include a WLAN system. The method comprises measuring S501 a channel quality information for the plurality of sub-carriers on which the terminal device STA1 60*a* transmits and/or on the sub-carriers assigned to other terminal devices STA2 60*b*, STA3 60*c*. For example, the terminal device STA1 60*a* measures on certain fields on the packets received the channel quality on the sub-carriers the STA1 communicates with and/or on the adjacent sub-carriers assigned to other terminal devices.

The method comprises determining S502 a channel quality indicator for the plurality of sub-carriers based on the measured channel quality information. Determining S502 comprises for example determining a channel quality indicator for each of the plurality of sub-carriers, and optionally averaging them over the plurality of sub-carriers. For example, determining S502 comprises measuring the cross-bandwidth pilots.

The method comprises determining S503, based on the channel quality information, CQI, a MCS recommendation to be used on a currently used sub-carrier to the network node AP 40 and/or on at least one other sub-carrier to the network node AP 40; and transmitting S504 the determined MCS recommendation and/or the determined plurality of channel quality indicators to the network node AP 40. For example, the terminal device STA1 60*a* determines the MCS recommendation using an MCS-CQI table that maps a CQI to a suitable MCS. The terminal device STA1 60*a* transmits the determined MCS recommendation for one or more sub-carriers so that when the AP 40 decides to change sub-carrier, the AP 40 is able to immediately make use of the recommended MCS.

According to some aspects, the method further comprises receiving S505 information from the network node AP 40. The information comprises an indication of a new sub-channel to the network node AP 40. The method further comprises transmitting S506 to the network node AP 40 on the new sub-channel indicated in the received information using, as MCS, the determined MCS recommendation corresponding to the new sub-channel. Thereby, the terminal device STA1 60*a* is able to immediately use the optimal MCS on the new sub-channel.

According to some aspects, the channel quality information includes information about noise limitation or information about interference limitation. The noise limitation is for example indicative of the noise floor on the link while the interference limitation is for example indicative of an interference level on a given sub-carrier, or the presence of an interference source on a given sub-carrier. When the link is interference limited, determining S503, based on the channel quality information, a MCS, recommendation comprises selecting a less robust MCS than a MCS currently used. When the link is noise limited, determining S503, based on the channel quality information, a MCS, recommendation comprises selecting a more robust MCS than the MCS currently used.

According to some aspects, measuring S501 channel quality information further comprises performing S501*a* implicit channel sounding by measuring interleaved pilots contained in an ACK frame. For example, the terminal device performs implicit channel sounding by measuring pilots present in a control data of an ACK frame received or another packet received, such as the LTF/STF fields, 11ax-LTF of FIG. 2*b*.

Figure 6A:
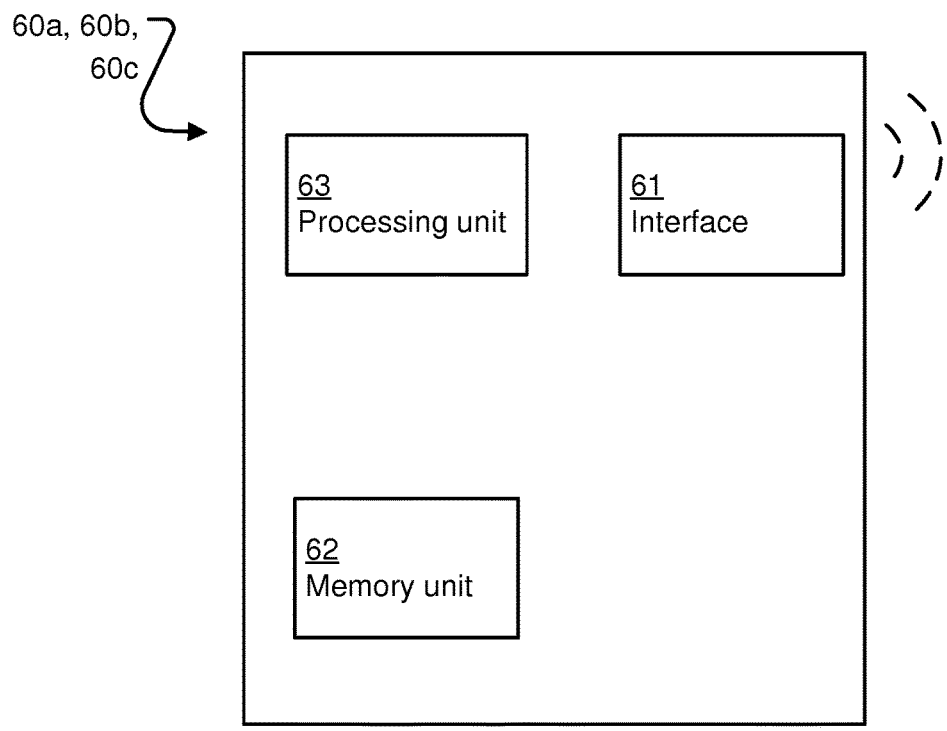
FIG. 6a is a block diagram illustrating a terminal device according to some aspects of the present disclosure.

FIG. 6*a* shows a block diagram illustrating an exemplary terminal device according to some aspects of this disclosure. FIG. 6*a* shows an exemplary terminal device 60*a-c* in terms of a number of functional units and shows the components or modules of a terminal device 60*a-c* according to an embodiment. The terminal device 60*a-c* is configured to select a modulation and coding scheme, MCS, for a link between a network node 40 and the terminal device 60*a* in an orthogonal frequency division multiple access, OFDMA, based system providing a plurality of sub-carriers. The terminal device 60*a-c* or the processing unit 63 comprises a processing unit 63 and a memory unit 62. The processing unit 63 uses for example any combination of one or more of a suitable central processing unit, CPU, multiprocessor, microcontroller, digital signal processor DSP, application specific integrated circuit, ASIC, field programmable gate arrays, FPGA etc., capable of executing software instructions stored in a computer program product, e.g. in the form of a storage medium or memory unit 62. Thus the processing unit 63 is thereby arranged to execute methods disclosed herein. The memory unit 62 may also comprise persistent storage, which, for example, can be any single one or combination of magnetic memory, optical memory, solid state memory or even remotely mounted memory. The terminal device 60*a-c* further comprises an interface 61 for communication with at least one network node 40, and/or another terminal device. As such the interface 61 may comprise one or more transmitters and receivers for wireless and/or wireline communications. The processing unit 63 controls the general operation of the terminal device 60*a-c* e.g. by sending data and control signals to the interface 61 and the memory unit 62, by receiving data and reports from the interface 61, and by retrieving data and instructions from the memory unit 62. Other components, as well as the related functionality, of the terminal device 60*a-c* are omitted in order not to obscure the concepts presented herein.

The processing unit 63 is configured to measure a channel quality information for the plurality of sub-carriers on which the terminal device STA1 60*a* transmits and/or receives and/or on the sub-carriers assigned to other terminal devices STA2 60*b*, STA3 60*c*. For example, the terminal device STA1 60*a* or the processing unit 63 measures on certain fields on the packets received the channel quality on the sub-carriers the STA1 communicates with and/or on the adjacent sub-carriers assigned to other terminal devices.

The processing unit 63 is configured to determine a plurality of channel quality indicators for the plurality of sub-carriers corresponding to a bandwidth or an entire bandwidth based on the measured channel quality information. For example, the processing unit 63 determines a channel quality indicator for each of the plurality of sub-carriers, and optionally averages them over the plurality of sub-carriers.

The processing unit 63 is configured to determine, based on the channel quality information, a MCS, recommendation to be used on a currently used sub-channel to the network node AP 40 and/or on the other sub-carriers to the network node AP 40; and transmit the determined MCS recommendation and the determined plurality of channel quality indicators to the network node AP 40. For example, the terminal device STA1 60*a* or the processing unit 63 determines the MCS recommendation using an MCS-CQI table that maps a CQI to a suitable MCS. The terminal device STA1 60*a* transmits the determined MCS recommendation for one or more sub-carriers so that when the AP 40 decides to change sub-channel, the AP 40 is able to immediately make use of the recommended MCS.

Figure 6B:
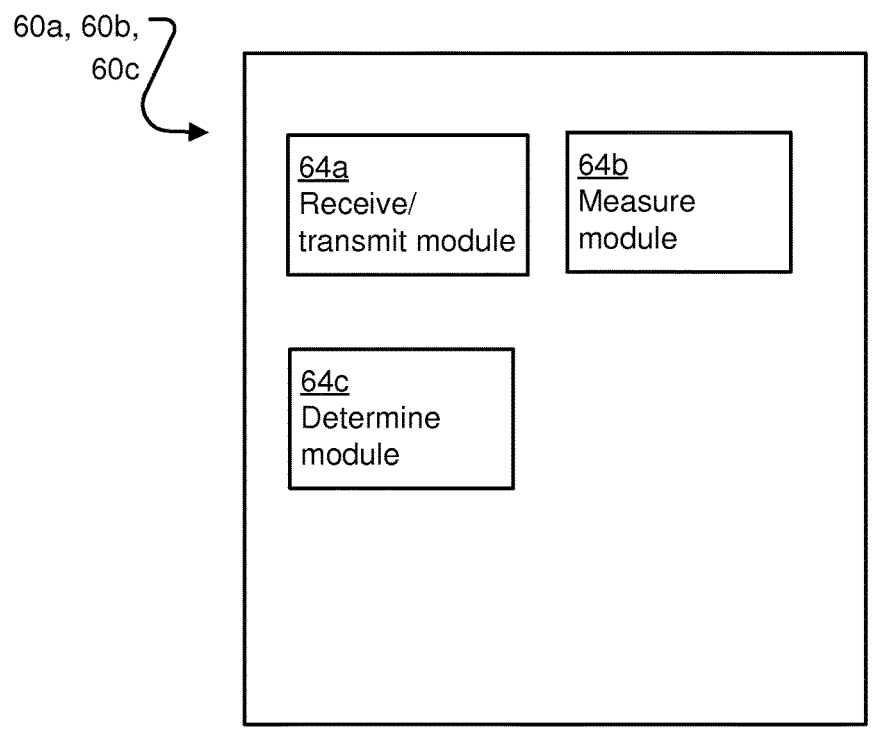
FIG. 6b is a schematic diagram showing functional units of a terminal device according to an embodiment.

FIG. 6*b* is a schematic diagram showing functional units of a terminal device 60*a-c* according to an embodiment. The terminal device 60*a-c* of FIG. 6*b* comprises a number of functional modules; a receiver/transmit module 64*a* configured to perform below steps S504 and optionally S505-S506, a measure module 64*b* configured to perform step S501, and a determine module 64*c* configured to perform steps S502, S503. The functionality of each functional module 64*a-d* will be further disclosed in the context of which the functional modules 64*a-d* may be used. In general terms, each functional module 64*a-d* may be implemented in hardware or in software. Preferably, one or more or all functional modules 64*a-d* may be implemented by a processing unit 63, possibly in cooperation with functional units 61 and/or 62 of FIG. 6*a*. The processing unit 63 may thus be arranged to fetch, from the memory module 62, instructions as provided by a functional module 64*a-d* and to execute these instructions, thereby performing any steps as will be disclosed hereinafter.

It should be appreciated that FIGS. 3, 4*a*-*b*-6*a*-*b* comprises some operations which are illustrated with a darker border and some operations which are illustrated with a dashed border. The operations which are comprised in a darker border are operations which are comprised in the broadest example embodiment. The operations which are comprised in a dashed border are example embodiments which may be comprised in, or a part of, or are further operations which may be taken in addition to the operations of the darker border example embodiments. It should be appreciated that these operations need not be performed in order. Furthermore, it should be appreciated that not all of the operations need to be performed. The example operations may be performed in any order and in any combination.

It should be appreciated that the example operations of FIGS. 3 and 5 may be performed simultaneously for any number of devices or nodes.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a modulation and coding scheme (MCS) processor of a network node, for MCS selection for a link between the network node and a terminal device in an orthogonal frequency division multiple access (OFDMA) based system, providing a plurality of sub-carriers, the method comprising:
   obtaining channel quality indicators for the plurality of sub-carriers;
   estimating a link quality over a bandwidth corresponding to a set of the plurality of sub-carriers corresponding to a sub-channel based on the obtained channel quality indicators, including a link quality for sub-carriers of a sub-channel on which the terminal device performs one or more of transmitting and receiving;
   selecting a sub-channel out of the plurality of sub-carriers as a new sub-channel to be used for one or more of a communication to the terminal device and a communication from the terminal device based on the determined link quality;
   selecting a MCS for the new sub-channel where the change of MCS is at least partly based on the difference in channel quality estimated for the previously used sub-carriers and estimated for the sub-carriers of the new sub-channel to be used for the next transmission; and
   transmitting information to the terminal device, the information comprising an indication of the new sub-channel to the terminal device.

2. The method according to claim 1, the method further comprising using the selected MCS for the new sub-channel to the terminal device.

3. The method according to claim 1, wherein the information further comprises an indication of a new sub-channel from the terminal device; and the selected MCS for the new sub-channel from the terminal device.

4. The method according to claim 1, wherein obtaining channel quality indicators involves receiving from the terminal device a channel quality information of one or more of sub-carriers on which the terminal device transmits or receives and sub-carriers assigned to other terminal devices.

5. The method according to claim 4, wherein the channel quality information includes a recommended MCS for one or more of sub-carriers on which the network node transmits and the sub-carriers assigned to other terminal devices.

6. The method according to claim 5, wherein the channel quality information from the terminal device for sub-carriers assigned to other terminal devices uses an index offset value related to the modulation and coding scheme on the same sub-carrier.

7. The method according to claim 4, wherein the channel quality information includes information about noise limitation or information about interference limitation.

8. The method according to claim 7, wherein, selecting an MCS comprises selecting a less robust MCS in response to the link being interference limited, and selecting a more robust MCS in response to the link being noise limited.

9. The method according to claim 8, wherein selecting a sub-channel comprises changing sub-channels for a plurality of terminal devices subjected to different interference limitations, and scheduling a first terminal device of the plurality of terminal devices, which is subjected to a relatively higher interference limitation, on a sub-channel that has more favorable channel conditions, and adapted with less robust MCS.

10. The method according to claim 1, wherein obtaining channel quality indicators further comprises performing implicit channel sounding by measuring interleaved pilots contained in an acknowledgement (ACK) frame.

11. The method according to claim 1, wherein the estimated link quality comprises one or more of a signal to noise ratio (SNR), a channel gain, and a SNR-MCS mapping table, wherein selecting the MCS is performed using the SNR-MCS mapping table.

12. A method, performed in a terminal device, for a modulation and coding scheme (MCS) selection in a link between a network node and the terminal device in an orthogonal frequency division multiple access (OFDMA) based system, providing a plurality of sub-carriers, the method comprising:
   measuring a channel quality information for a set of sub-carriers corresponding to one or more of a sub-channel on which the terminal device performs one or more of transmitting and receiving, and sub-carriers assigned to other terminal devices;

determining a channel quality indicator for the plurality of sub-carriers based on the measured channel quality information;

determining, based on the channel quality information, a MCS recommendation to be used on one or more of a currently used sub-channel to the network node and at least one other sub-carrier to the network node; and transmitting the determined MCS recommendation to the network node.

13. The method according to claim 12, the method further comprising receiving information from the network node, the information comprising an indication of a new sub-channel to the network node.

14. The method according to claim 13, the method further comprising transmitting to the network node on the new sub-channel indicated in the received information using the determined MCS recommendation corresponding to the new sub-channel as MCS for the new sub-channel.

15. The method according to any claim 12, wherein the channel quality information includes information about noise limitation or information about interference limitation.

16. The method according to claim 15, wherein determining, based on the channel quality information, a MCS, recommendation comprises selecting a less robust MCS than a MCS currently used in response to the link being interference limited, and selecting a more robust MCS than the MCS currently used in response to the link being noise limited.

17. The method according to claim 12, wherein measuring channel quality information further comprises performing implicit channel sounding by measuring interleaved pilots contained in an ACK frame.

18. The method of claim 12, further comprising:
transmitting the determined plurality of channel quality indicators to the network node.

19. A network node for modulation and coding scheme (MCS) selection for a link between the network node and a terminal device in an orthogonal frequency division multiple access (OFDMA) based system, providing a plurality of sub-carriers, the network node comprising an interface, a memory, and a MCS processor, wherein the MCS processor is configured to:
obtain channel quality indicators for the plurality of sub-carriers;
estimate a link quality over a bandwidth corresponding to a set of the plurality of sub-carriers corresponding to a sub-channel based on the obtained channel quality indicators, including a link quality for sub-carriers of a sub-channel on which the terminal device performs one or more of transmitting and receiving;
select a sub-channel out of the plurality of sub-carriers as a new sub-channel to be used for one or more of a communication to the terminal device and a communication from the terminal device based on the determined link quality;
select a MCS for the new sub-channel where the change of MCS is at least partly based on the difference in channel quality estimated for the previously used sub-carriers and estimated for the sub-carriers of the new sub-channel to be used for the next transmission;
transmit information to the terminal device, the information comprising an indication of the new sub-channel to the terminal device.

20. The network node according to claim 19, wherein the MCS processor is configured to transmit further information to the terminal device, the further information comprising an indication of a new sub-channel from the terminal device and the selected MCS for the new sub-channel from the terminal device.

21. The network node according to claim 19, wherein the MCS processor is configured to obtain channel quality indicators by receiving from the terminal device a channel quality information for one or more of sub-carriers on which the terminal device transmits or receives, and sub-carriers assigned to other terminal devices.

22. The network node according to claim 21, wherein the channel quality information includes information about noise limitation or information about interference limitation.

23. The network node according to claim 22, wherein the MCS processor is configured to change the MCS to a less robust MCS in response to the link being interference limited, and to change the MCS to a more robust MCS in response to the link being noise limited.

24. The network node according to claim 23, wherein the MCS processor is configured to change sub-channels for a plurality of terminal devices subjected to different interference limitations, and to schedule a first terminal device of the plurality of terminal devices, which is subjected to a relatively higher interference limitation, on a sub-channel that has more favorable channel conditions, and adapted with less robust MCS.

25. A terminal device for a modulation and coding scheme (MCS) selection in a link between a network node and the terminal device in an orthogonal frequency division multiple access (OFDMA) system, being configured with a plurality of sub-carriers, the terminal device comprising an interface, a memory, and a processor configured to:
measure a channel quality information for a set of sub-carriers corresponding to one or more of a sub-channel on which the terminal device performs one or more of transmitting and receiving, and sub-carriers assigned to other terminal devices;
determine a plurality of channel quality indicators for the plurality of sub-carriers based on the measured channel quality information;
determine, based on the channel quality information, a MCS recommendation to be used on one or more of a currently used sub-channel to the network node and the other sub-carriers to the network node; and
transmit the determined MCS recommendation to the network node.

26. A non-transitory computer readable storage medium comprising a computer program product for selecting a modulation and coding scheme (MCS), the computer program product comprising program code that is configured to cause a MCS processor of a network node to perform a method for MCS selection for a link between the network node and a terminal device in an orthogonal frequency division multiple access (OFDMA) based system, providing a plurality of sub-carriers, the method comprising:
obtaining channel quality indicators for the plurality of sub-carriers;
estimating a link quality over a bandwidth corresponding to a set of the plurality of sub-carriers corresponding to a sub-channel based on the obtained channel quality indicators, including a link quality for sub-carriers of a sub-channel on which the terminal device performs one or more of transmitting and receiving;
selecting a sub-channel out of the plurality of sub-carriers as a new sub-channel to be used for one or more of a communication to the terminal device and a communication from the terminal device based on the determined link quality;

selecting a MCS for the new sub-channel where the change of MCS is at least partly based on the difference in channel quality estimated for the previously used sub-carriers and estimated for the sub-carriers of the new sub-channel to be used for the next transmission; and transmitting information to the terminal device, the information comprising an indication of the new sub-channel to the terminal device.

27. A non-transitory computer readable storage medium comprising a computer program product for selecting a modulation and coding scheme (MCS), the computer program product comprising program code that is configured to cause a processor of a terminal device to perform a method for a modulation and coding scheme (MCS) selection in a link between a network node and the terminal device in an orthogonal frequency division multiple access (OFDMA) based system, providing a plurality of sub-carriers, the method comprising:

measuring a channel quality information for one or more of a set of sub-carriers corresponding to a sub-channel on which the terminal device performs one or more of transmitting and receiving, and sub-carriers assigned to other terminal devices;

determining a channel quality indicator for the plurality of sub-carriers based on the measured channel quality information;

determining, based on the channel quality information, a MCS recommendation to be used on one or more of a currently used sub-channel to the network node and at least one other sub-carrier to the network node; and transmitting the determined MCS recommendation to the network node.

* * * * *